(No Model.)

R. J. TALBOT.
MERRY-GO-ROUND.

No. 566,945. Patented Sept. 1, 1896.

WITNESSES:
M. F. Bligh.
Chas. H. Luther Jr

INVENTOR:
Romuald J. Talbot,
by Joseph A. Miller & Co.,
Attys.

UNITED STATES PATENT OFFICE.

ROMUALD J. TALBOT, OF PROVIDENCE, RHODE ISLAND.

MERRY-GO-ROUND.

SPECIFICATION forming part of Letters Patent No. 566,945, dated September 1, 1896.

Application filed May 20, 1896. Serial No. 592,250. (No model.)

*To all whom it may concern:*

Be it known that I, ROMUALD J. TALBOT, of Providence, in the county of Providence and State of Rhode Island, have invented certain new and useful Improvements in Merry-Go-Rounds; and I hereby declare that the following is a full, clear, and exact description of the same, reference being had to the accompanying drawings, forming part of this specification.

This invention has reference to improvements in devices in which carriages are supported from above and caused to be moved by the movement of the supports.

The objects of the invention are to improve and strengthen the supporting-frame and to simplify its connection with the driving-shaft.

The invention consists in the peculiar features of construction and combination of parts whereby the objects of the invention are carried into effect.

Figure 1:
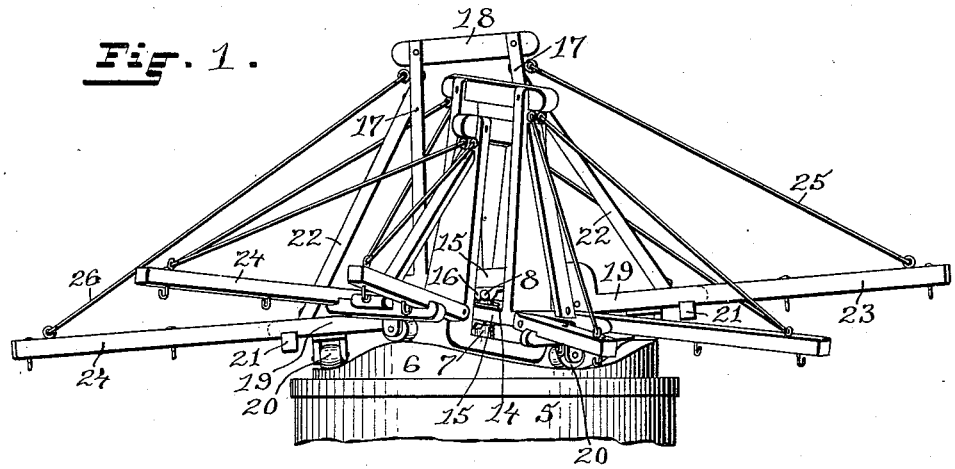
Figure 2:
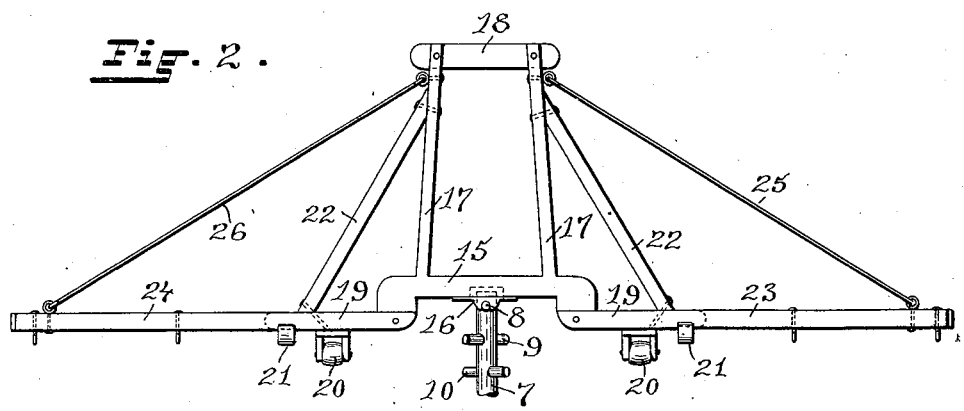
Figure 3:
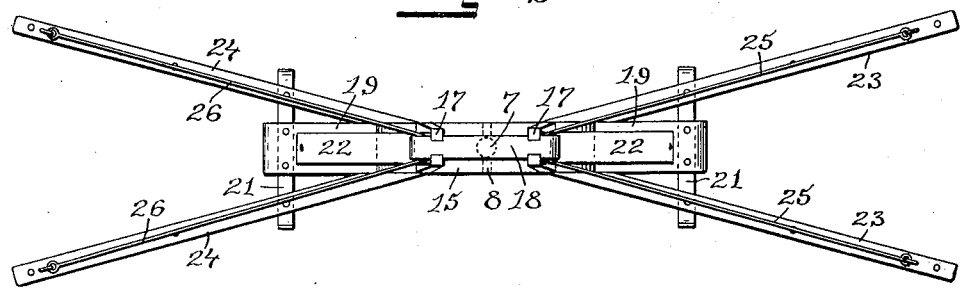

Figure 1 represents an elevation of portions of the merry-go-round. Fig. 2 represents a side view of one of the supporting truss-frames shown in combination with the drive-shaft. Fig. 3 represents a plan view of Fig. 2.

Similar numbers of reference designate corresponding parts throughout.

In the drawings, 5 represents a tubular cylindrical support or base provided at its upper portion with the annular cam 6 and embracing the vertical drive-shaft 7, furnished with a suitable number of transverse engaging-pins 8, 9, and 10, the number of these pins being determined by the number of supporting-frames which are to be engaged by the pins and driven by the rotation of the shaft.

On the cam 6 are normally supported the truss-frames 11, 12, and 13, each of which is furnished with roller-bearings free to move on the face of the annular cam. These truss supporting-frames are similar in construction, with the exception that provision is made in the central portions of the frames (marked 12 and 13) for the working of the shaft 7 through the same, as at 14 in Fig. 2.

The truss supporting-frames each consist of a central member 15, having a recess or opening, as 14, to receive the shaft 7, and step-plates, as 16, with which the pins 8, 9, or 10 may engage. To the member or base 15 are secured the uprights 17 17, which are connected at their upper portions by the cross-piece 18. Secured to the end portions of the central member or base 15 are the lateral members 19 19, each of which is furnished with a roller-bearing 20 20 and has a cross-piece 21 21 at its outer end, the outer ends of these members being braced against upward movement by the inclined braces 22 22, secured to said members and to the uprights 17 17. The supporting-arms 23 23 and 24 24 are secured to central member 15 and to the cross-pieces 21 21 and sustained at their outer ends by the stays 25 and 26, fastened to the arms and to the uprights 17 17.

The carriages for one or more passengers are sustained by the outer ends of the arms 23 23 and 24 24, the strain on which is taken up by the stays 25 and 26, secured to the central open pier formed by the uprights 17 17 and the cross-piece 18.

The truss supporting-frames are supported by the roller-bearings, as 20, on the annular track formed by the face of the cam 6. Thus the drive-shaft 7 is not subjected to any strain caused by sustaining the weight of the truss-frames, but can be constructed with particular reference to the resistance of the torsional strain caused in the driving action of the shaft on the frames through their connections.

Having thus described my invention, I claim as new and desire to secure by Letters Patent—

1. In a merry-go-round, the combination with a central base having an annular cam-shaped track at its upper portion, and a drive-shaft within the base, of a series of truss supporting-frames comprising central open piers the bases of which are connected with the drive-shaft, lateral members extending from said bases and furnished with roller-bearings working on the annular track, braces secured to the lateral members and to the piers, diverging supporting-arms secured to the base portion of the pier, and stays secured to the upper portion of the pier and to the outer ends of the diverging arms.

2. The combination with an annular track, and the drive-shaft axially disposed within the track and having the pin 8, of a truss supporting-frame comprising the base 15, the plates 16, secured to said base, for engaging the pin 8, the uprights 17 17, the cross-piece 18 secured to said uprights, the members 19 19 extending laterally from the base 15 and provided with the roller-bearings 20 20 and the cross-pieces 21 21, the braces 22 22 secured to the members 19 and to the uprights 17, the supporting-arms 23 23 and 24 24 secured to the base 15 and to the cross-pieces 21, and the stays 25 25 and 26 26 secured to the uprights 17 and to the outer ends of said arms 23 and 24, as and for the purpose described.

In witness whereof I have hereunto set my hand.

ROMUALD J. TALBOT.

Witnesses:
JOSEPH A. MILLER,
JOSEPH A. MILLER, Jr.